(12) United States Patent
Ishida et al.

(10) Patent No.: US 6,857,555 B2
(45) Date of Patent: Feb. 22, 2005

(54) METHOD AND APPARATUS FOR FRICTION STIR WELDING

(75) Inventors: Ryooji Ishida, Yamaguchi (JP); Kazushige Fukuyori, Yamaguchi (JP); Norihisa Okada, Yamaguchi (JP)

(73) Assignee: Hitachi, Ltd., Tokyo (JP)

( * ) Notice: Subject to any disclaimer, the term of this patent is extended or adjusted under 35 U.S.C. 154(b) by 46 days.

(21) Appl. No.: 10/229,112

(22) Filed: Aug. 28, 2002

(65) Prior Publication Data

US 2003/0192941 A1 Oct. 16, 2003

(30) Foreign Application Priority Data

Apr. 16, 2002 (JP) ........................................ 2002-113670

(51) Int. Cl.⁷ .............................................. B23K 20/12
(52) U.S. Cl. ...................................... 228/112.1; 228/2.1
(58) Field of Search ................................ 228/2.1, 112.1

(56) References Cited

U.S. PATENT DOCUMENTS

| | | | | | |
|---|---|---|---|---|---|
| 5,971,252 | A | * | 10/1999 | Rosen et al. | 228/112.1 |
| 6,045,028 | A | * | 4/2000 | Martin et al. | 228/112.1 |
| 6,237,835 | B1 | * | 5/2001 | Litwinski et al. | 228/112.1 |
| 6,315,187 | B1 | * | 11/2001 | Satou et al. | 228/112.1 |
| 6,344,117 | B2 | * | 2/2002 | Enomoto et al. | 204/298.09 |
| 6,457,629 | B1 | * | 10/2002 | White | 228/112.1 |
| 6,530,513 | B2 | * | 3/2003 | Ezumi et al. | 228/112.1 |
| 6,543,671 | B2 | * | 4/2003 | Hatten et al. | 228/112.1 |
| 6,572,007 | B1 | * | 6/2003 | Stevenson et al. | 228/112.1 |
| 6,585,148 | B2 | * | 7/2003 | Aono et al. | 228/112.1 |
| 2001/0047935 | A1 | * | 12/2001 | Enomoto et al. | |
| 2003/0024965 | A1 | * | 2/2003 | Okamura et al. | |
| 2003/0042292 | A1 | * | 3/2003 | Hatten et al. | |
| 2003/0047587 | A1 | * | 3/2003 | Anon et al. | |

FOREIGN PATENT DOCUMENTS

| | | |
|---|---|---|
| EP | 1 224998 | 7/2002 |
| EP | 1285707 A1 * | 2/2003 |
| JP | 02001205457 A * | 7/2001 |
| JP | 2002-210571 | 7/2003 |

* cited by examiner

*Primary Examiner*—Kiley Stoner
(74) *Attorney, Agent, or Firm*—Antonelli, Terry, Stout & Kraus, LLP (57) ABSTRACT

Two members 10 and 20 are welded together by cutting a groove 41 having a determined cross-sectional shape using a cutting tool 60 along the abutted portion between the two members 10 and 20, inserting a filler member 30 substantially having the same cross-sectional shape to the groove so as to substantially eliminate the gap at the abutted portion, temporarily welding together the projections 12, 22 and the filler member 30, and thereafter, friction stir welding the members 10, 20 and the filler member 30 together completely using a rotary tool 81.

8 Claims, 6 Drawing Sheets

METHOD AND APPARATUS FOR FRICTION STIR WELDING

FIELD OF THE INVENTION

The present invention relates to a method and apparatus for friction stir welding, and especially relates to a welding method desirably applied to manufacture railway car bodies.

DESCRIPTION OF THE RELATED ART

Friction stir welding is a method performed by inserting a rotating round shaft (called a rotary tool) to the joint region between members to be welded and moving the same along the joint line, thereby heating, softening and plasticizing the material of the members approximate the tool so as to perform solid-phase welding of the members.

The gap formed between the abutted members is an important factor in performing the friction stir welding. If the gap is too large, it is difficult to obtain a good friction-stir-weld. However, in manufacturing a car body of a railway car and the like where the members to be welded together is as large as approximately 20 m in length and 3 m in width, fabrication error of the members become rather excessive, and as a result, the gap may become too large.

According to Japanese Patent Laid-Open Provisional Publication No. 2000-233285, a filler member is disposed in the gap formed to the abutted region between the two members to be welded together upon performing the friction stir welding.

Moreover, Japanese Patent No. 3014654 (U.S. Pat. No. 6,050,474) discloses providing projections to the members near the abutting region, respectively, and filling the gap using the metal constituting the projections as filler material when performing the friction stir welding.

When inserting a filler member to the gap formed between the members to be welded together, it is important that this filler member is fixed firmly to position so as not to deviate from the gap during the friction stir welding.

It is possible to fix the filler member to the abutted members by welding, but the high heat provided during welding may cause distortion of the members. Moreover, if the friction stir welded surface is to be utilized without having coating applied thereto, the welded portion may remain discolored and may deteriorate the appearance of the welded surface.

SUMMARY OF THE INVENTION

The present invention aims at providing a method and apparatus for friction stir welding that enables to achieve a good weld with an attractive appearance.

The above object can be achieved by abutting two members against each other, cutting a groove along the abutted joint line, disposing a filler member in the groove formed by the cutting step, friction stir welding at least one of the members and the outer side of the filler member from the outer side of said two members using a first rotary tool, and friction stir welding the two members and the filler member to a depth deeper than the weld depth of the above friction stir welding step using a second rotary tool.

DETAILED DESCRIPTION OF THE PREFERRED EMBODIMENT

The preferred embodiment of the present invention will now be explained with reference to FIGS. 1 through 10. However, the technical scope of the present invention is not limited to the values disclosed in the claims or in the embodiments of the present invention, but is extended for example to variations, modifications and changes of the disclosure that can be envisioned by those having ordinary skill in the field of art.

Two plate-shaped members 10 and 20 are mounted on a bed 25 and abutted against each other so that the rims oppose one another. The members are fixed in this position. A gap is often formed between the abutted members. Projections 12 and 22 are provided to the upper surface of the opposing abutted portions of members 10 and 20, respectively. Further, on the lower surface of the abutting region of member 20 is provided a projecting block 23 that protrudes toward the lower surface of the abutting region of member 10.

The two members 10 and 20 are pushed against each other and fixed to the bed 25 so that the gap 40 between the members 10 and 20 is either minimized or diminished, the gap being at least smaller than a predetermined gap size. The predetermined gap size is either equal to or substantially smaller than a gap 41 mentioned later.

The members 10 and 20 are extruded shape members made of aluminum alloy. The abutted portion (surfaces) of the two members 10, 20 is called a joint line. As mentioned later, the material of the filler member 30 is the same as the material of members 10, 20.

Figure 1:
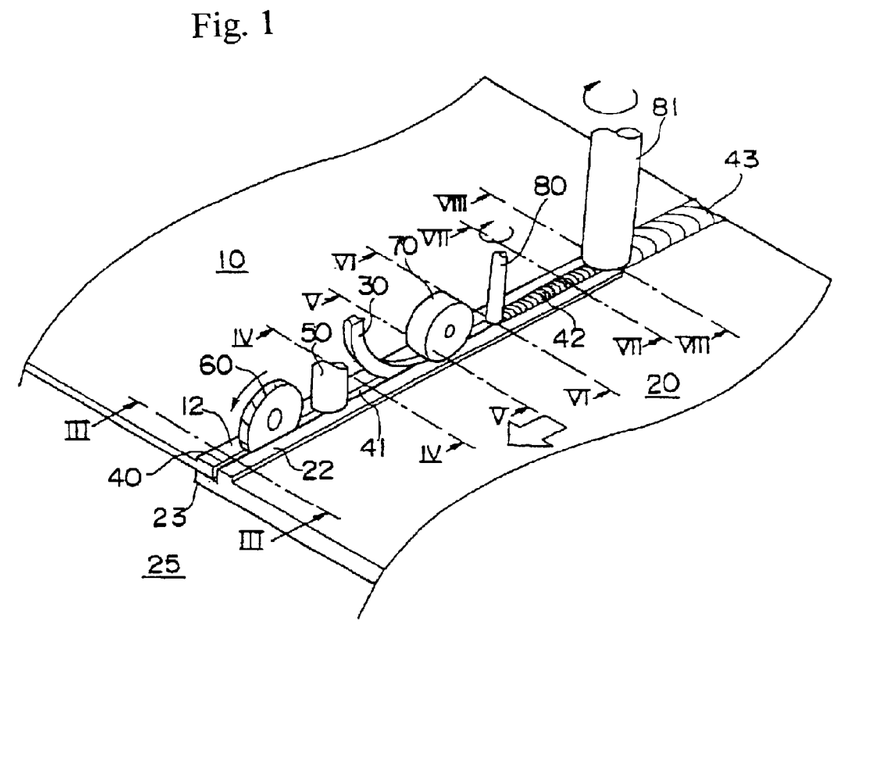
FIG. 1 is a typified perspective view illustrating the processes according to one embodiment of the present invention.
Figure 2:
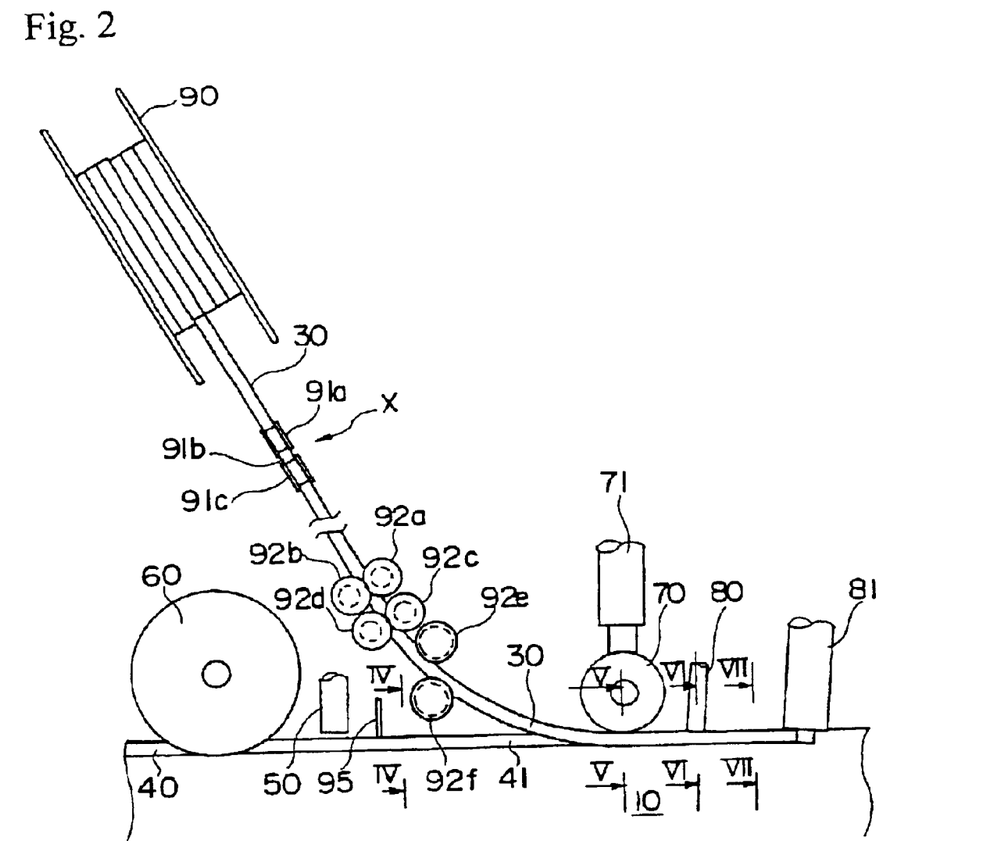
FIG. 2 is a simplified side view of the processes according to one embodiment of the present invention, especially illustrating the feeding unit of the filler member.
Figure 3:
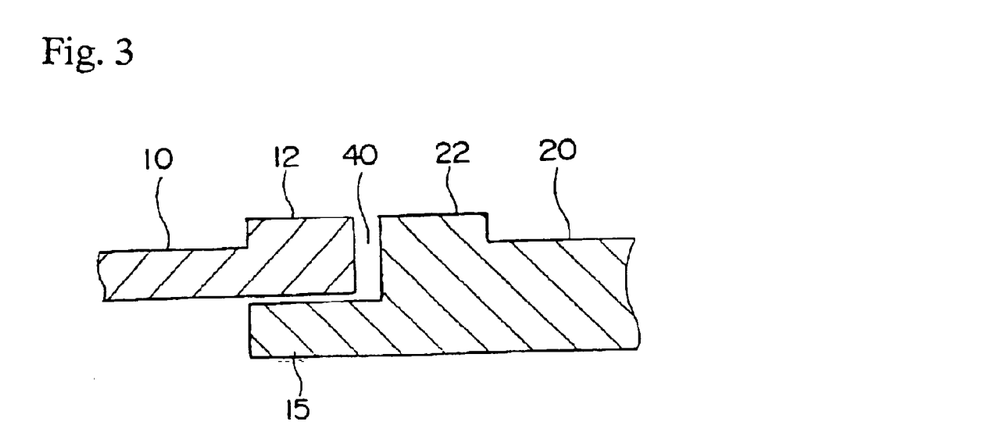
FIG. 3 is a III—III cross-sectional view of FIG. 1.
Figure 4:
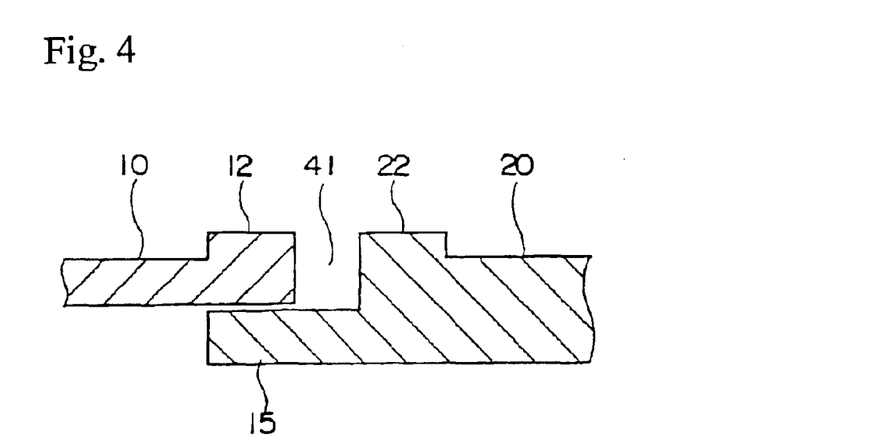
FIG. 4 is a IV—IV cross-sectional view of FIGS. 1 and 2.
Figure 5:
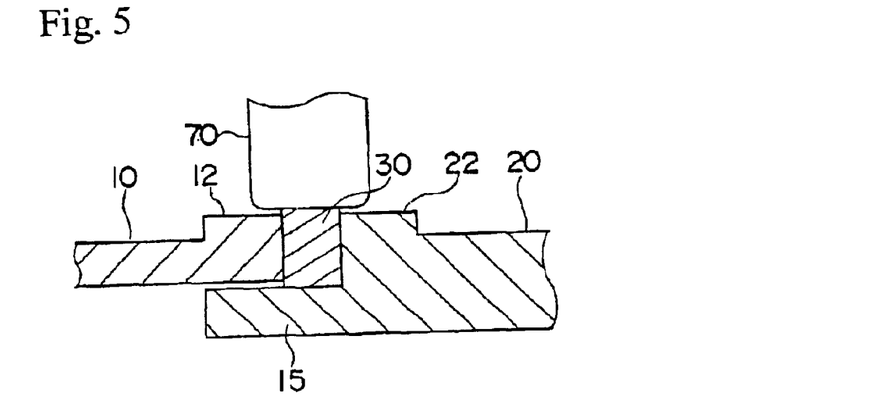
FIG. 5 is a V—V cross-sectional view of FIGS. 1 and 2.
Figure 6:
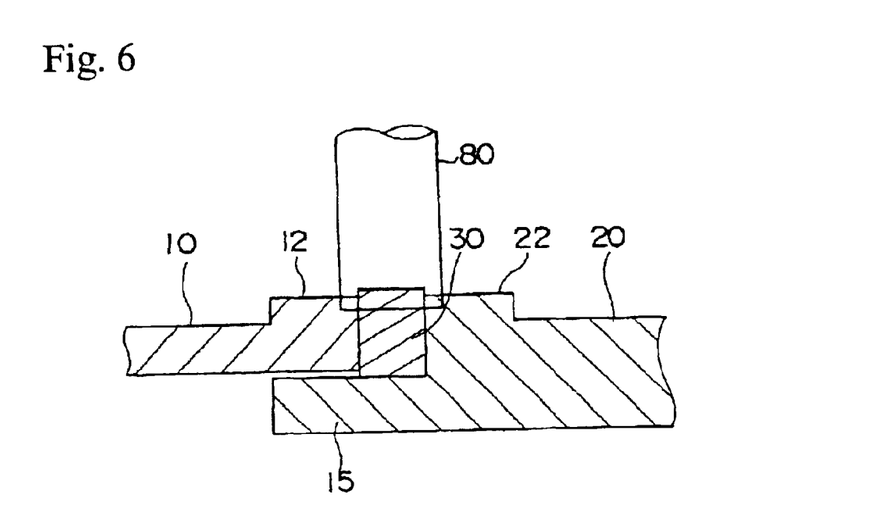
FIG. 6 is a VI—VI cross-sectional view of FIGS. 1 and 2.

The friction stir welding apparatus comprises units illustrated in FIGS. 1 and 2 (not including members 10, 20 and bed 25 but including the supply apparatus of filler member 30), which includes a moving body so that it moves against the bed 25 to which the members 10, 20 are fixed at a determined speed. In FIG. 1, the apparatus moves from right to left (in the direction illustrated by the large white arrow). In FIG. 2, the apparatus moves from right to left. In other words, the cutting tool 60 on the left side cuts the members 10 and 20 first, and the machining advances in the direction of the friction stir welding tool 81 disposed on the right side.

After fixing the members 10 and 20 on the bed 25, the joint line (where gap 40 exists) is cut from the upper side using a cutting tool 60 to create a predetermined groove 41. The groove 41 is rectangular. The opposing sides of groove 41 (the ends of members 10 and 20) are parallel.

The width of this cut is at least large enough so that both side walls defining the gap 40 do not remain. The cut depth is as deep as the upper surface of the projecting block 23. Dry cutting is performed in the cutting process.

In the figures, the cutting tool 60 is illustrated as a circular saw, but other cutting tools such as a slotting milling cutter or an end mill can also be used to provide the same effect. In conclusion, it is required that the depth and the width of the cut are uniform.

Thereafter, the swarf created by the cutting tool 60 is removed either by blowing compressed air from a swarf removal nozzle 50 or by sucking them into a dust collector.

Behind the swarf removal nozzle 50 is disposed a rubber plate 95 that comes into contact with the upper surface of the projections 12 and 22, the upper surface of the members 10 and 20 extending outside the projections, and the projecting block 23 within the groove 41. Thus, the rubber plate blocks the swarf from traveling further rearward.

After manufacturing the groove 41, the filler member 30 is inserted to the groove 41. This is realized by pulling out the filler member 30 from a reel 90, introducing the member 30 to the groove 41, and pressing the member 30 downward by a press roller 70 to insert the same to the groove. The press roller 70 presses the upper surface of the filler member 30 downward against the bottom of groove 41 by the function of an air cylinder device 71 (or compression spring).

The height of the filler member 30 is determined so that the upper surface of the filler member 30 rises slightly above the upper surfaces of projections 12, 22 when the lower surface of the filler member 30 contacts the upper surface of the projecting block 23.

The cross-sectional shape of the filler member 30 is substantially equal to that of the groove 41. The width of the filler member 30 is substantially equal to the width of the groove 41. The filler member 30 is inserted relatively easily to the groove 41 by the press roller 70, but there is no excessive gap formed between the filler member 30 and the member 10 (20). The difference in the width of filler member 30 and groove 41 is set smaller than 1 mm.

The filler member 30 is wound around a rotatable reel 90, which is extended to the press roller 70 via straightening rollers 91a, 91b and 91c, and feeding rollers 92a, 92b, 92c, 92d, 92e and 92f in this order. These rollers come into contact with the filler member 30.

The straightening rollers 91a, 91b and 91c are for sandwiching the filler member 30 that has been wound around the reel 90, thereby straightening the curl of the member 30. The straightening rollers 91a and 91b mainly contact the inner surface of the filler member 30 wound around the reel 90. The straightening roller 91c mainly contacts the outer surface of the filler member 30 wound around the reel 90. The contact surfaces of the straightening rollers 91a, 91b and 91c coming into contact with the filler member 30 (the outer circumference of the rollers) are recessed. The filler member 30 enters the recess.

The feeding rollers 92a, 92b, 92c and 92d are rollers for pulling out the filler member 30 from the reel 90 and feeding it to the groove 30. The feeding rollers contact the height-direction surface (the surface oriented along the height of the groove 41) of the filler member 30. The contact surfaces of the feeding rollers that come into contact with the filler member 30 are recessed. The filler member 30 is inserted to the recess. The feeding rollers 92a and 92c are driven by a motor via a torque limiter. Thus, the filler member 30 is sent toward the longitudinal direction by predetermined force.

The feeding rollers 92a and 92c are connected to feeding rollers 92b and 92d, respectively. For example, gears are provided to the outer circumference of feeding rollers 92a, 92c, 92b and 92d, the gears of feeding rollers 92a and 92c being engaged with the gears of feeding rollers 92b and 92d.

The feeding rollers 92a, 92b, 92c, 92d, 92e and 92f are guide rollers for the filler member 30. The feeding rollers 92e and 92f do not have motors. The feeding rollers 92e and 92f contact the height-direction surface (the surface oriented along the height of the groove 41) of the filler member 30. The contact surface of the feeding roller coming into contact with the filler member 30 is recessed. The filler member 30 enters the recess.

After inserting the filler member 30 to the groove 41, a rotary tool 80 is used to temporarily weld the filler member 30 to the members 10 and 20 at a position behind the press roller 70. This welding is a friction stir welding performed using the rotary tool 80.

In general, a rotary tool used for friction stir welding has a small-diameter portion disposed at the tip of a large-diameter portion, but according to this embodiment, the rotary tool 80 does not have a small-diameter portion. The tip of the rotary tool 80 is flat. The rotary tool 80 is inserted to the members 10, 20 and the filler member 30 from above. The axial center of the rotary tool 80 is slanted similar to a normal rotary tool. The slanting direction is also the same as an ordinary friction stir weld. The rotary tool 80 is rotated.

The diameter of the rotary tool 80 is somewhat greater than the width of groove 41. For example, if the width of the groove 41 is 3 mm, the diameter of the rotary tool 80 is set to 6 mm. The insertion depth of the rotary tool 80 to the projections 12 and 22 is very little since this welding is only temporary. For example, the welding depth is 1.0 mm from the upper surface of the projections 12 and 22. The weld strength of the temporal weld should be enough to prevent the filler member 30 from moving out of the groove 41 during the friction stir welding treatment performed using the rotary tool 81. In other words, the insertion depth is determined so that such weld strength is achieved.

The upper end of the filler member 30 is located higher than the upper surfaces of projections 12 and 22. The filler member 30 is protruded than the projections 12 and 22. Therefore, even if a gap is formed between the filler member 30 and the groove 41 due to fabrication errors, the gap can be filled by the projecting portion of the filler member 30. Thus, the filler member 30 can be firmly fixed to the members 10 and 20. Moreover, when pressing and inserting the filler member 30 into the groove using the press roller 70, the filler member 30 can come into close contact with the projecting block 23, thereby enabling to realize a strong weld.

Figure 7:
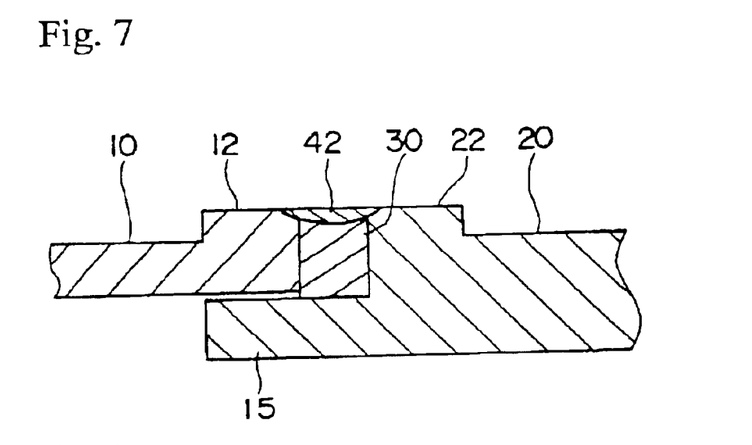
FIG. 7 is a VII—VII cross-sectional view of FIGS. 1 and 2.
Figure 8:
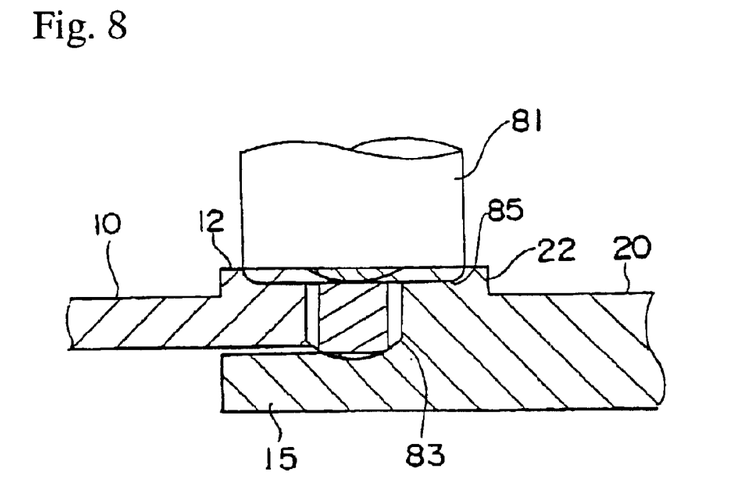
FIG. 8 is a VIII—VIII cross-sectional view of FIG. 1.

When friction stir welding is performed using the rotary tool 80, the upper surface of the weld joint becomes somewhat dented. In FIGS. 7 and 8, the upper surface of the weld joint is illustrated as being flat.

Since no screw thread is provided on the outer circumference of the large-diameter portion of rotary tool 80, there is no fear of the filler member 30 and the projections 12, 22 being pushed out in the axial direction of the rotary tool 80 during the friction stir welding.

It is preferable that the position of the rotary tool 80 is disposed as close to the press roller 70 as possible.

Next, the three members, which are the projections 12, 22 and the filler member 30, are friction stir welded using the rotary tool 81. This welding is performed to securely weld the members 10 and 20 together.

The rotary tool 81 comprises a small-diameter portion disposed to the tip of a large-diameter portion. The diameter of the small-diameter portion is somewhat larger than the width of the filler member 30 and the width of the groove 41. During friction stir welding, the lower end of the boundary between the large-diameter portion and the small-diameter portion of the rotary tool 81 is disposed above the upper surface of the members 12 and 22 excluding the projections 12 and 22, but lower than the top portion of the projections 12 and 22. Similarly, the tip of the small-diameter portion of the rotary tool 81 is disposed either near the upper surface of the projecting block 23 or inside the projecting block 23.

As mentioned earlier, if there is a gap formed between the filler member 30 and the members 10, 20, the gap is filled using as material the filler member 30 and the projections 12 and 22 disposed above the upper surface of the members 10, 20 (excluding the projections 12, 22) The upper surface of the weld joint is somewhat dented.

Thereafter, if necessary, the filler member 30 and the projections 12 and 22 (forming the weld joint portion) located above the upper surface of the members 10 and 20 excluding the projections 12 and 22 are cut and removed to realize a smooth flat surface.

Figure 9:
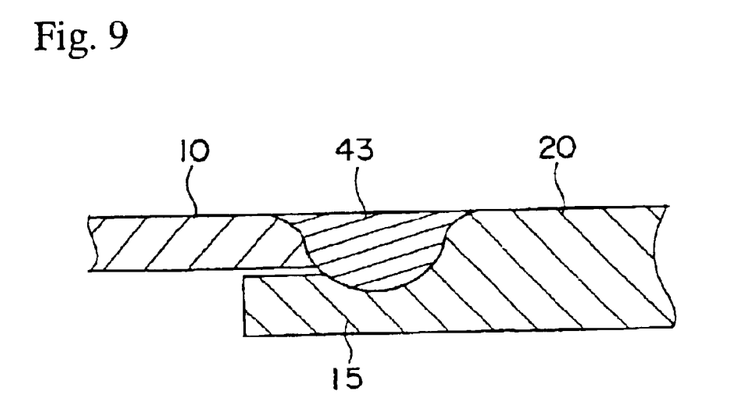
FIG. 9 is a cross-sectional view illustrating the weld joint of the members having the abutted friction stir weld joint being smoothed.
Figure 10:
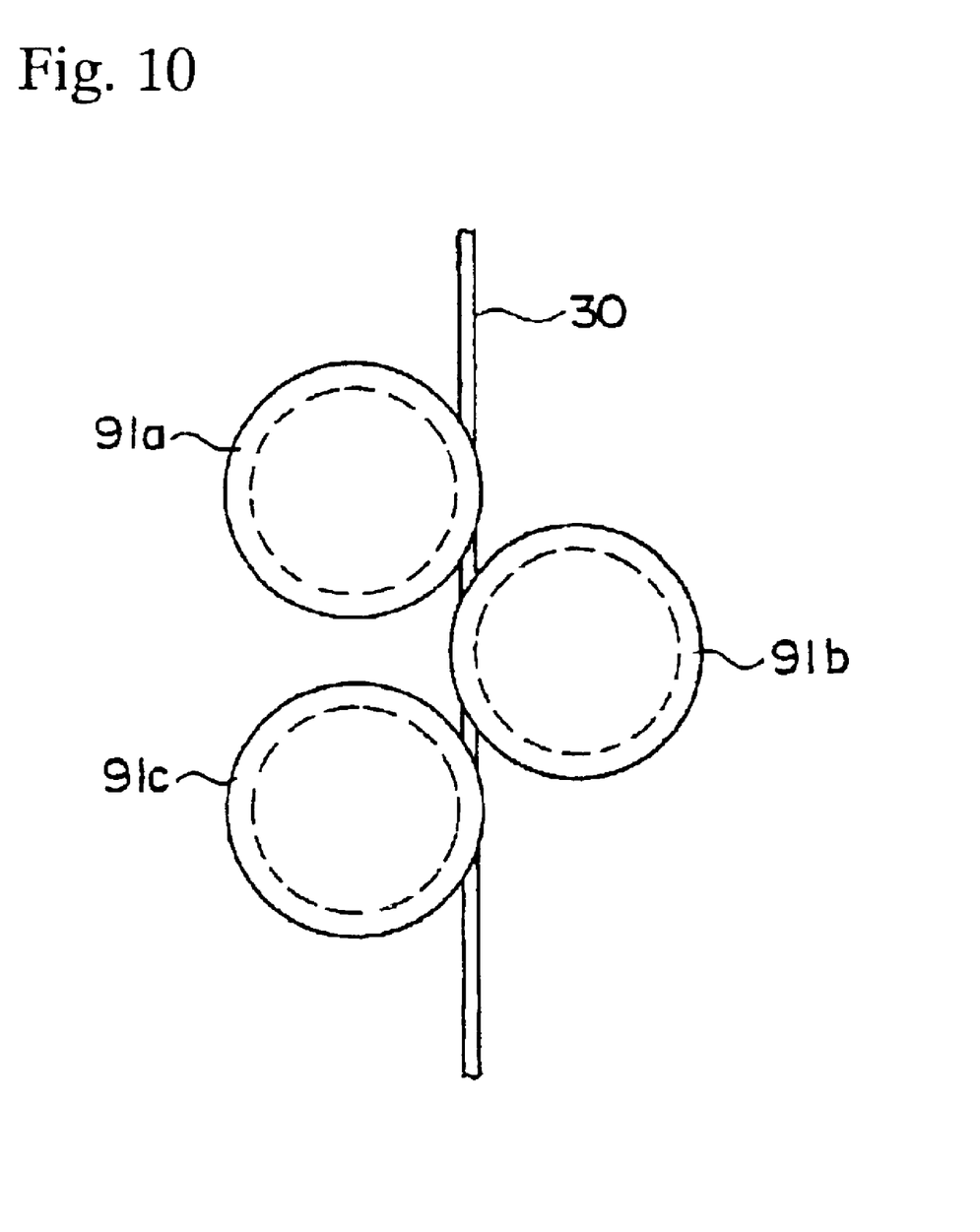
FIG. 10 is an X-arrow view of FIG. 2.

FIG. 9 illustrates the cross-section of the friction stir weld joint having a flattened upper surface by removing the projections 12, 22 and the weld joint disposed above the upper surface of the members 10, 20. The area designated by reference number 43 is the friction stir weld joint.

The cutting tool 60 and the rotary tools 80 and 81 are respectively designed to be able to move independently in the direction orthogonal to the joint line, in other words, in the width direction of the gap 40 (groove 41). This is for detecting the position of the joint line (gap 40, groove 41) and for positioning the cutting tool 60 and the rotary tools 80 and 81 to the center of the joint line. Moreover, the cutting tool 60 and the rotary tools 80 and 81 can be moved independently in the vertical direction, respectively. This is to control the cut depth of the cutting tool 60 (depth of the groove 41) and the weld depth of the rotary tools 80 and 81 to a determined depth.

In order to realize the above advantage, optical sensors (not shown) are provided to the apparatus for detecting the position of projections 12 and 22. The optical sensors detect the width position of the two projections 12 and 22, in order to position the cutting tool 60 and rotary tools 80 and 81 at the center of width thereof. Moreover, the optical sensors detect the height position of the upper surfaces of projections 12 and 22, in order to insert the cutting tool 60 and the rotary tools 80 and 81 to a predetermined depth.

The driving force provided by the feeding rollers 92a, 92b, 92c and 92d to the filler member 30 must be strong enough to oppose to the push-back force acting on the filler member 30 during the friction stir welding performed by the rotary tool 81.

The distance from the feeding rollers 92e and 92f to the press roller 70, the distance from the press roller 70 to the rotary tool 80, and the distance from the rotary tool 80 to the rotary tool 81 must respectively be set to a distance that does not cause the buckling of the filler member 30 at respective locations by the force pushing back the filler member 30.

According to this embodiment, even if a gap exists along the joint line upon abutting and welding two members, the joint line can be cut to form a gap having a predetermined size into which a filler member is inserted to substantially eliminate the gap formed to the joint line before performing friction stir welding, thus enabling to achieve a good weld.

If the joint portion is to be smoothed after the friction stir welding and hair-line finish is to be performed thereto, a good appearance is achieved because the material of the filler member 30 is the same as that of the host material (members 10 and 20), so there is little discoloration.

Moreover, the rotary tool 80 can have a small-diameter portion disposed at the tip of a large-diameter portion, similar to rotary tool 81.

Figure 11:
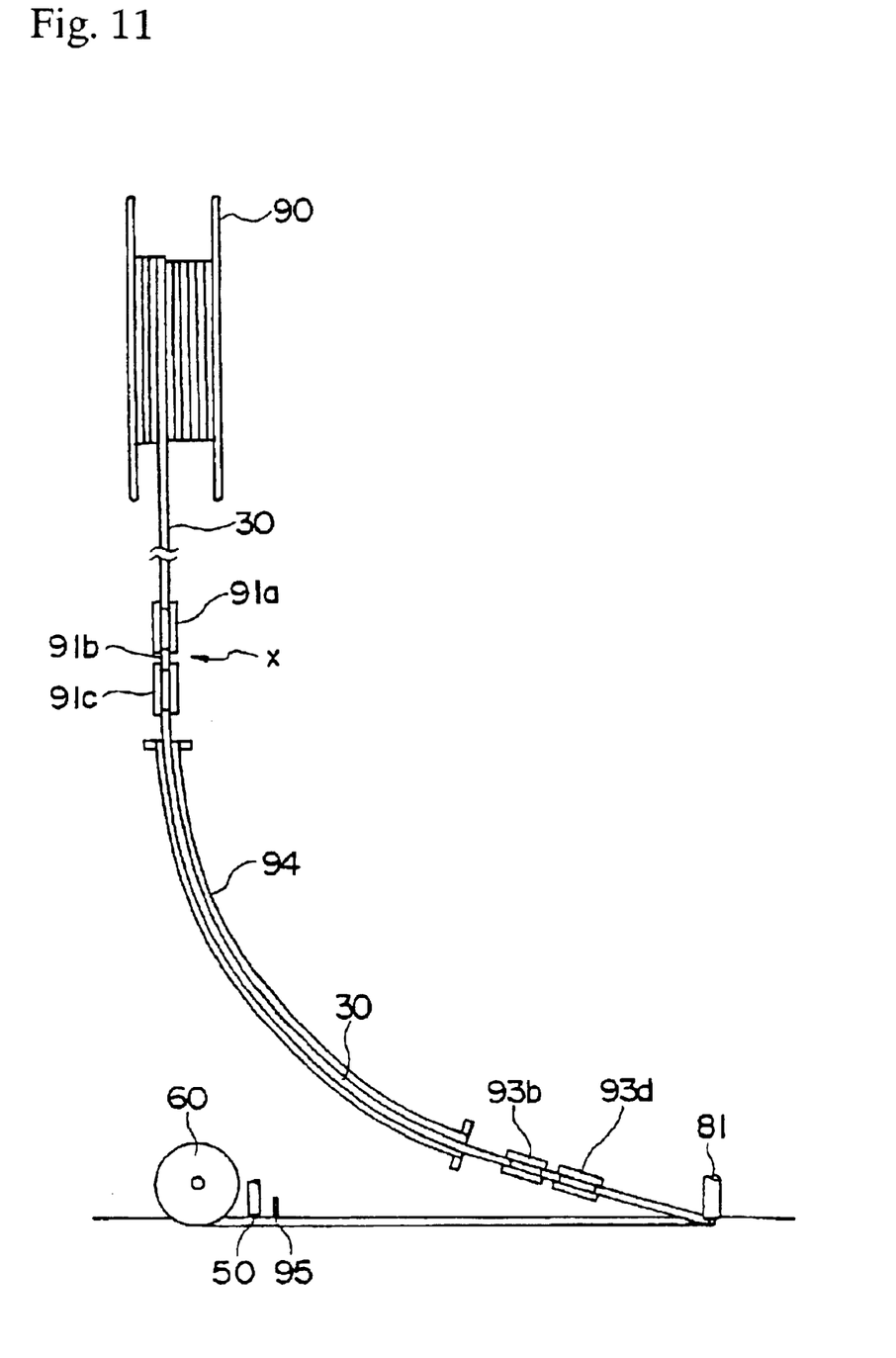
FIG. 11 is a simplified side view illustrating the processes according to another embodiment of the present invention, especially illustrating the feeding unit of the filler member.

Another preferred embodiment of the present invention will be explained with reference to FIG. 11. The reference numbers of FIG. 11 that are the same as those used in FIGS. 1 through 10 refer substantially to the same members. This embodiment mainly refers to an example where the temporal welding is eliminated.

The feeding rollers 92a, 92b, 92c and 92d are located having a 90-degree angle difference from the example illustrated in FIG. 2. A guide roller can be disposed between the straightening rollers 91a–91c and feeding rollers 93a–93d, which is not disposed according to the present embodiment, but instead, a guide tube 94 is disposed. The guide tube 94 is abrasion resistant, rigid, and has flexibility. It can be, for example, a Teflon (registered trademark) tube. There is an appropriate gap between the inner diameter of the guide tube 94 and the filler member 30. Both ends of the guide tube 94 are fixed to the moving body (not shown) on which the present friction stir welding apparatus is mounted. In FIG. 11, the filler member 30 within the guide tube 94 is illustrated by a solid line. A press roller 70 can be utilized but not used in the illustrated embodiment. The rotary tool 80 for temporary weld is eliminated.

The feeding force provided by the feeding rollers 92a–92d is sufficient so as to feed the filler member 30 resisting against the push-back force provided by the rotary tool 81. The distance between the feeding rollers 93a–93d and the rotary tool 81 is set so as not to cause the buckling of the filler member 30 by the push-back force. Thus, the temporal welding by the rotary tool 80 can be omitted.

In utilizing the supply rollers 92a–92f, the rollers must be disposed movably against the moving body, but the structure can be simplified by utilizing the guide tube 94 instead.

One example of the sizes etc. of the members utilized in the present invention will now be explained.

The material of members 10, 20 and filling material 30: aluminum alloy

The plate thickness of members 10, 20 (excluding the thickness of projections 12, 22): 4 mm Width of projections 12, 22: 8 mm Height of projections 12, 22 (excluding the plate thickness of members 10, 20): 2 mm Width of groove 41: 3 mm Depth of groove 41: 6 mm Width of filler member 30: 3 mm Height of filler member 30: 6.5 mm Diameter of rotary tool 80: 6 mm Friction stir weld depth of rotary tool 80:
1.0 mm from the surface of projections 12, 22

According to the present invention, a good friction stir weld can be achieved by cutting and forming a predetermined gap between the two abutted members, filling the gap with a filler member so as to substantially eliminate the gap between the abutted members, and performing friction stir welding thereto.

What is claimed is:

1. A friction stir welding method comprising:
   abutting two members against each other;
   cutting a groove along the abutted joint line;
   disposing a filler member in the groove formed by the cutting step;
   friction stir welding at least one of the two members and said filler member from the outer surface of said two members using a first rotary tool; and
   friction stir welding said two members and said filler member to a depth deeper than the weld depth of the first friction stir welding using a second rotary tool.

2. A friction stir welding method according to claim 1, wherein
   said friction stir welding step using the first rotary tool is performed so as to friction-stir-weld the portions of the two members disposed on the outer surface side and the portion of the tiller member disposed on the outer surface side.

3. A friction stir welding method comprising:
   abutting two members against each other;
   cutting a groove along the abutted joint line;
   pulling out a filler member wound around a reel, straightening said filler member by passing said filler member through at least a pair of straightening rollers;
   guiding the filler member through an interior of an elongated guide tube; and then
   disposing said filler member in the groove formed by the cutting step; and
   friction stir welding said two members and said filler member using a rotary tool.

4. A friction stir welding method comprising:
   abutting two members against each other;
   cutting a groove along the abutted joint line;
   pulling out a filler member wound around a reel, sending out said filler member between a pair of feeding rollers, and disposing said filler member in the groove formed by the cutting step; and
   friction stir welding said two members and said filler member using a rotary tool;
   wherein the push-out force provided by said pair of feeding rollers is greater than the force provided by said rotary tool pushing back said filler member during the friction stir welding step; and
   the distance between said feeding rollers and said rotary tool is set smaller than the distance by which the filler member is buckled by said pushing force.

5. A friction stir welding apparatus comprising:
   a reel to which is wound a filler member;
   a cutting tool for cutting a groove along a joint line where two members are abutted against each other;
   an elongated guide tube for guiding said filler member, said guide tube being disposed between said reel and said groove formed by the cutting tool, the filler member guided through the interior of said guide tube; and
   a rotary tool for friction stir welding the filler member inserted to said groove and said two members.

6. The friction stir welding apparatus according to claim 5, further comprising at least a pair of straightening rollers for straightening the filter member provided between said reel and said guide tube.

7. The friction stir welding apparatus according to claim 5, wherein said guide tube is curved such that a feed direction of the filler material changes in said guide tube.

8. The friction stir welding method according to claim 3, wherein a feed direction of the filler material is changed in said guide tube.

* * * * *